US012049077B2

(12) United States Patent
Xu

(10) Patent No.: US 12,049,077 B2
(45) Date of Patent: Jul. 30, 2024

(54) SMART LABEL PRINTER AND PRINTING METHOD THEREOF

(71) Applicant: Xiamen iPrt Technology Co., Ltd., Fujian (CN)

(72) Inventor: Shuangquan Xu, Fujian (CN)

( * ) Notice: Subject to any disclaimer, the term of this patent is extended or adjusted under 35 U.S.C. 154(b) by 148 days.

(21) Appl. No.: 17/727,252

(22) Filed: Apr. 22, 2022

(65) Prior Publication Data

US 2023/0339243 A1 Oct. 26, 2023

(51) Int. Cl.

| | |
|---|---|
| ***B41J 11/42*** | (2006.01) |
| ***B41J 3/407*** | (2006.01) |
| ***B41J 11/00*** | (2006.01) |
| ***B41J 29/02*** | (2006.01) |

(52) U.S. Cl.

CPC ............ *B41J 11/42* (2013.01); *B41J 3/4075* (2013.01); *B41J 11/0095* (2013.01); *B41J 29/02* (2013.01)

(58) Field of Classification Search

CPC ....................................................... B41J 3/4075

See application file for complete search history.

(56) References Cited

U.S. PATENT DOCUMENTS

| | | | | |
|---|---|---|---|---|
| 5,150,130 | A * | 9/1992 | Sato | B41J 29/02 400/613 |
| 2003/0223800 | A1* | 12/2003 | Wiklof | B41J 11/70 400/621 |
| 2014/0147187 | A1* | 5/2014 | Jo | B41J 29/13 400/613 |
| 2017/0072723 | A1* | 3/2017 | Yamanaka | B41J 29/13 |
| 2020/0391524 | A1* | 12/2020 | Kim | B41J 11/706 |
| 2022/0371345 | A1* | 11/2022 | Ando | B41J 29/02 |

FOREIGN PATENT DOCUMENTS

| | | |
|---|---|---|
| CN | 214873639 U | 11/2021 |
| CN | 113978137 A | 1/2022 |

* cited by examiner

*Primary Examiner* — Shelby L Fidler

(57) ABSTRACT

The present invention provides a smart label printer and a printing method thereof. The printer is provided with a print channel, a through-beam photoelectric switch, a paper exit sensor, a rubber roller shaft, a controller and the like in cooperation with a printing module for printing. According to the printing method disclosed by the present invention, the label paper can be printed in a correct position more accurately, reducing the waste of the label paper, and the printer can intelligently identify the length of the printed label paper, and can be applied to print label paper in different sizes.

1 Claim, 6 Drawing Sheets

SMART LABEL PRINTER AND PRINTING METHOD THEREOF

FIELD OF TECHNOLOGY

The present invention relates to the field of printers, in particular to a smart label printer and a printing method thereof.

BACKGROUND

In the printing process of a label printer, paper may be jammed. To resolve this problem, the printing part needs to be opened upwards. When the paper is replaced, the part opened upward may be touched by mistake and fall back heavily due to the gravity. If such a phenomenon occurs many times, the printer may be damaged. Some other printers with locking mechanisms have relatively complex structures, are larger in size, take up more space, and are not suitable for desktop use. Because the printer paper needs to be replaced frequently when the printer operates, in the existing printer, the connecting shaft is disposed on one side of the paper feed channel. After the printer is opened, the upper cover module is still located above the paper feed channel and is likely to block a hand when it replaces the paper. In the prior art, many label printers mostly use fixed label print paper, which is troublesome to adjust when replaced.

SUMMARY

An objective of the present invention is to provide a smart label printer and a printing method thereof, such that after the printing module is opened, the space above the paper feed channel is completely unobstructed, which is beneficial to replace printer paper. In addition, the printer is provided with a through-beam photoelectric switch, a paper exit sensor and a controller in cooperation with the printing module for printing. The present invention further provides a printing method. According to the printing method, the label paper can be printed in a correct position more accurately, reducing the waste of the label paper; and the printer can intelligently identify the length of the label paper, and can be applied to print label paper in different sizes.

To achieve the foregoing objective, the present disclosure provides the following solutions.

A smart label printer includes a printer base, where the printer base is internally mounted with a rubber roller shaft, and the rubber roller shaft is configured to guide paper; a printing module, disposed above the printer base, where one side of the printing module is hinged with one side of the printer base, the printing module is opened upward or buckled downward relative to the printer base, and the printing module is internally mounted with a printing device; a print channel, formed between the printing module and the printer base when the printing module is buckled with the printer base, where a paper feed is disposed at one end of the print channel, and a paper exit is disposed at the other end; and a through-beam photoelectric switch, including an emission sensor and a receiving sensor, where the emission sensor is disposed in the printer base, the receiving sensor is disposed in the printing module, and when the printing module is buckled with the printer base, a position of the emission sensor corresponds to that of the receiving sensor in a vertical direction.

The smart label printer further includes a paper exit sensor, disposed on one side of the paper exit on the printer base; and a controller, disposed in the printer base, where the controller is electrically connected to the printer base, the printing module, the emission sensor, the receiving sensor, and the paper exit sensor, and a timer is provided on the controller.

The emission sensor is disposed in the printer base between the paper feed and the paper exit of the print channel, a first through hole is provided in a position of a base cover corresponding to the emission sensor, and the first through hole facilitates emitting light to the outside by the emission sensor.

The receiving sensor is disposed in the printing module, the printing module is provided with a second through hole, the second through hole corresponds to a position of the first through hole, and the receiving sensor is mounted in the second through hole.

In addition, a printing method of a smart label printer is provided and includes:

S1, after receiving a print signal, controlling, by the controller of the printer, the rubber roller shaft to start to transfer label paper, and when the paper exit sensor at the paper exit begins to detect the label paper, performing counting and recording, by the timer on the controller, a current time point as t0 at which the position of the label paper is shown in FIG. 6;

S2, continuing to transfer the label paper by the rubber roller shaft, recording, by the timer on the controller, a current time point as t1 at which the position of the label paper is shown in FIG. 6, when the through-beam photoelectric switch detects a paper gap of the label paper, where in this case, the label paper protrudes from the paper exit by a length S; and continuing to transfer the label paper by the rubber roller shaft, recording, by the timer, a current time point as t2 at which the position of the label paper is shown in FIG. 6 and stopping counting, when the through-beam photoelectric switch detects a paper gap again, where a distance by which the label paper is transferred to the paper exit from the time point t1 to the time point t2 is A, that is, a distance between the two paper gaps on the label paper is A, and in this case, the rubber roller shaft stops transferring the label paper;

S3, allowing a distance between the through-beam photoelectric switch and the paper exit sensor to be C, whereby a distance L between the through-beam photoelectric switch and an edge of one protruding end of the label paper is equal to a sum of the distance C between the through-beam photoelectric switch and the paper exit sensor and the length S by which the label paper protrudes from the paper exit from the time point t0 to the time point t1, that is L=C+S, where a distance between an edge of the label paper and its closest paper gap at the time point t1 is obtained as B by performing modulus calculation on A by using L, that is, B=L−A; and when B is 0, it indicates that a first label on the label paper is complete, and when B is not 0, it indicates that the first label is incomplete; and S4, controlling, by the controller, the rubber roller shaft to reversely rotate for returning the label paper by a length of A+S−B+D in a case that a distance between the edge of the label paper and the paper exit sensor at the time point t2 is A+S and a distance between the paper exit sensor and its closest paper gap is A+S−B, where D is a distance between a center of the rubber roller shaft and the paper exit sensor.

It can be known through an analysis that the present invention discloses a smart label printer and a printing method thereof. The label paper of the printer is placed on one side of the paper feed of the printer, without a paper bin for supporting paper, to reduce the volume of the printer. The printer is provided with a through-beam photoelectric switch, a paper exit sensor and a controller in cooperation with the printing module for printing. According to the printing method disclosed by the present invention, the label paper can be printed in a correct position more accurately, reducing the waste of the label paper; and the printer can intelligently identify the length of the printed label paper, and can be applied to print label paper in different sizes.

The technical solution of the present invention decreases the operation difficulty, greatly reduces the replacement time and operation intensity, and saves costs.

BRIEF DESCRIPTION OF THE DRAWINGS

The accompanying drawings of this specification which constitute a part of the present application provide further comprehension of the present invention. The schematic embodiments of the present invention and description thereof are intended to explain the present invention and do not constitute an improper limitation to the present invention. In the drawings.

REFERENCE NUMERALS

Figure 1:
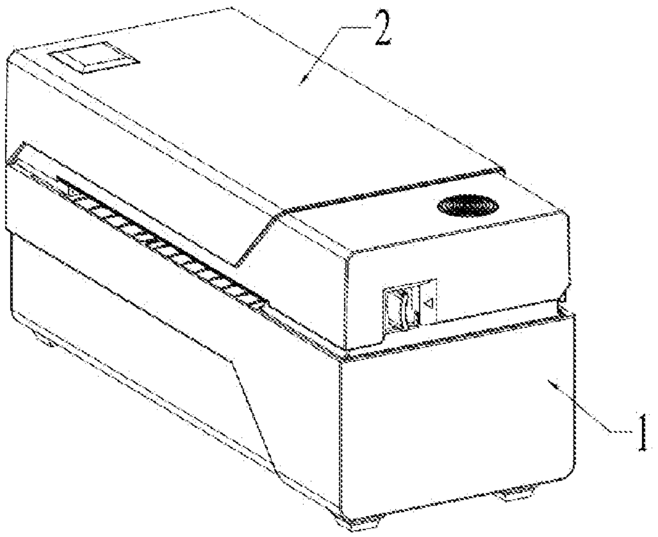
FIG. 1 is a schematic diagram of a structure according to the present invention.
Figure 2:
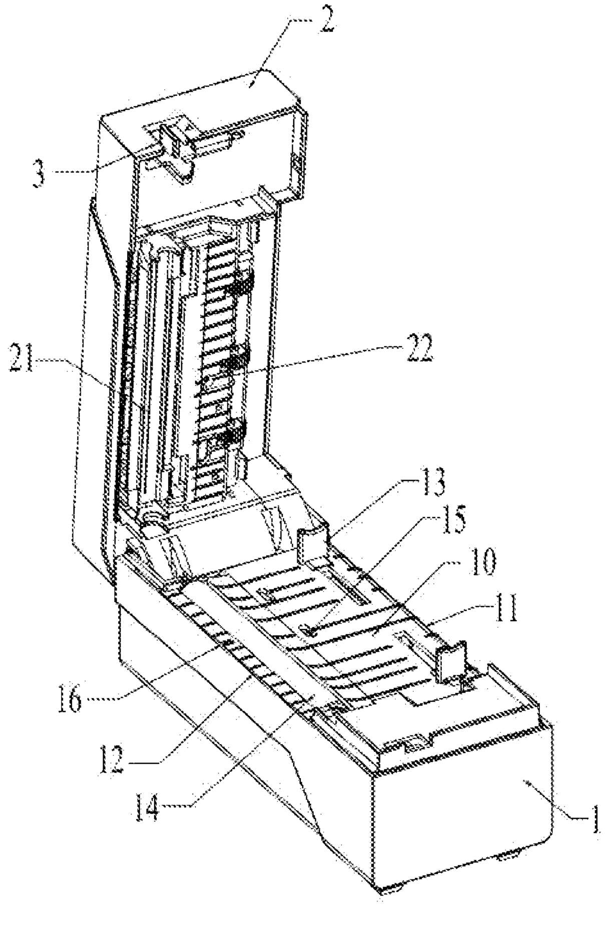
FIG. 2 is a schematic structural diagram in which a printing module is opened relative to a printer base according to the present invention.
Figure 3:
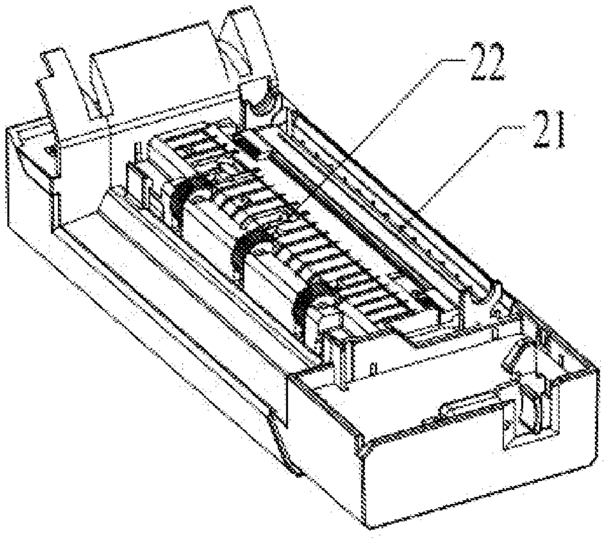
FIG. 3 is a schematic structural diagram of the printing module according to the present invention.
Figure 4:
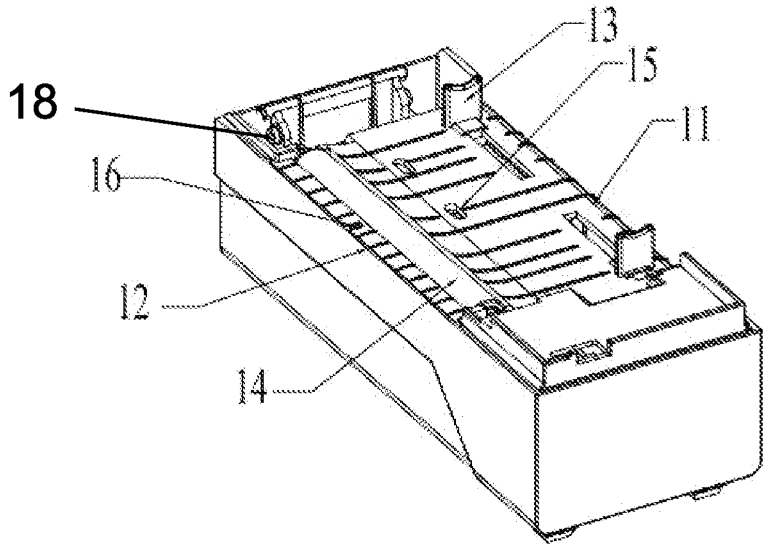
FIG. 4 is a schematic structural diagram of the printer base according to the present invention.
Figure 5:
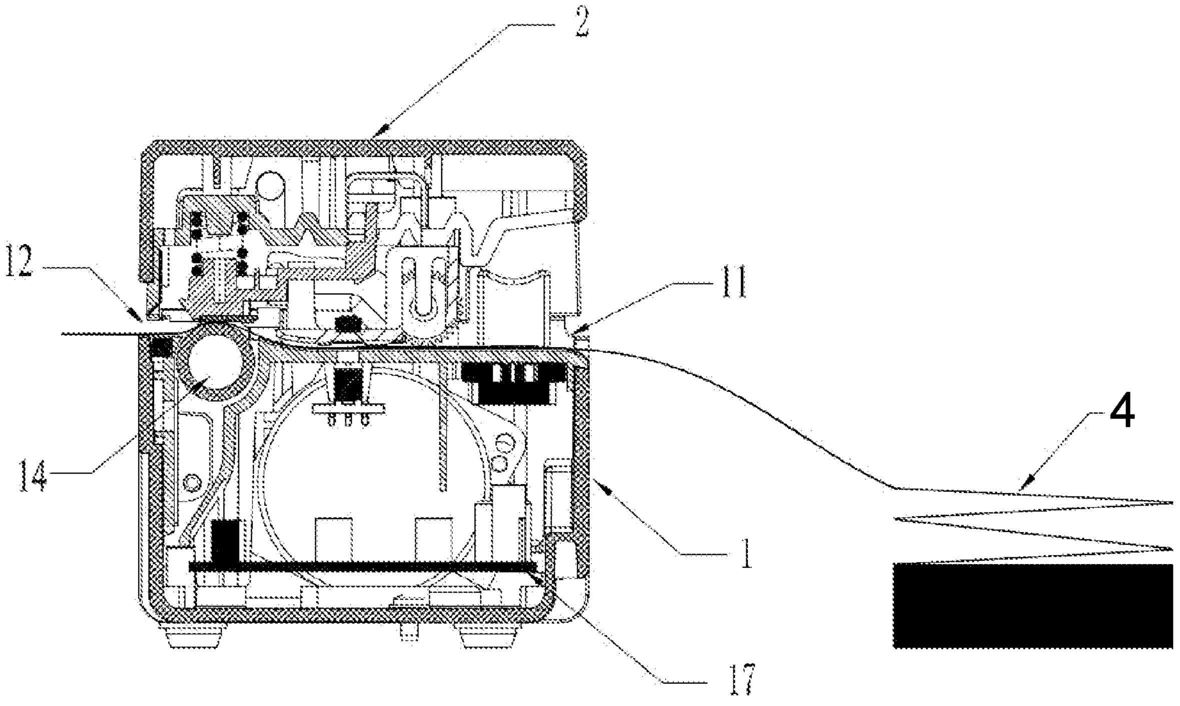
FIG. 5 is a schematic diagram in which the printing module is buckled with the printer base according to the present invention.

1—Printer base; 2—Printing module; 10—Base cover; 11—Paper feed; 12—Paper exit; 13—Limiter; 14—Rubber roller shaft; 15—Emission sensor; 16—Paper exit sensor; 17—Controller; 21—Print head assembly; and 22—Receiving sensor.

DETAILED DESCRIPTION OF THE EMBODIMENTS

The present invention is described in detail below with reference to the accompanying drawings and the embodiments. Each example is provided through explanation in the present invention and does not limit the present invention. It is clear for those skilled in the art that modifications and variations can be made in the present invention without departing from the scope or spirit of the present invention. For example, some of the features illustrated or described in an embodiment can be used to form another embodiment. Therefore, it is intended that the present invention includes such modifications and variations falling within the scope of the appended claims and their equivalents.

In the description of the present invention, terms such as “longitudinal”, “transverse”, “upper”, “lower”, “front”, “rear”, “left”, “right”, “vertical”, “horizontal”, “top”, and “bottom”, indicate the orientation or position relationships based on the accompanying drawings, which are only beneficial to describe the present invention and do not require that the present invention must be constructed and operated in a particular orientation, and therefore should not be construed as a limitation of the present invention. The terms “interconnection”, “connection” and “disposed” used in the present invention should be understood in a broad sense. For example, the connection may be a fixed connection or a detachable connection; a direct connection or an indirect connection by using intermediate components; or a wired electrical connection, a wireless electrical connection or a wireless communication signal connection. For those of ordinary skill in the art, the specific meanings of the terms can be understood according to specific situations.

One or more examples of the present invention are shown in the accompanying drawings. In the detailed description, numerals and letters are used to refer to features in the accompanying drawings. The similar reference numerals in the accompanying drawings and description are used to refer to similar parts of the present invention. As used herein, the terms “first,” “second,” “third,” and the like can be used interchangeably to distinguish one element from another, and are not intended to denote a position or importance of an individual element.

As shown in FIG. 1 to FIG. 6, according to an embodiment of the present invention, a smart label printer and a printing method thereof are provided. The smart label printer includes a printer base 1 and a printing module 2 disposed above the printer base 1. One side of the printing module 2 is hinged with one side of the printer base 1 by a shaft 18, the printing module 2 is opened upward or buckled downward relative to the side hinged with the printer base 1, and the printing module is internally mounted with a printing device. A toggle hook 3 with a toggle block is provided on the other side of the printing module 2. The printing module 2 is buckled with the printer base 1 by using the toggle hook 3. When the printing module 2 is buckled with the printer base 1, a print channel is formed between the printing module 2 and the printer base 1. A paper feed 11 is disposed at one end of the print channel, and a paper exit 12 is disposed at the other end. In such a way, a feeding direction of the label paper 4 is parallel to an axis of the shaft 18. A base cover 10 is disposed above the printer base 1. A limiter 13 in communication with the inside of the printer base is disposed on one side of the base cover 10 close to the paper feed 11 of the print channel and configured to limit the position of the printer paper. A rubber roller shaft 14 in communication with the inside of the printer base 1 is disposed on one side close to the paper exit 12 of the print channel and configured to guide the printer paper on one side of the paper exit 12. A print head assembly 21 is disposed in a position of printing module 2 corresponding to the rubber roller shaft 14. The printer base 1 is internally provided with a controller 17. The rubber roller shaft 14 and the print head assembly 21 are electrically connected to the controller 17.

To accurately control label printing, a through-beam photoelectric switch is mounted in the printer and includes:

- an emission sensor 15, disposed in the printer base 1, between the paper feed 11 and the paper exit 12 of the print channel, where a first through hole is provided in a position of a base cover 10 corresponding to the emission sensor 15, and the emission sensor 15 emits light to the outside through the first through hole; and
- a receiving sensor 22, disposed in the printing module 2, where the printing module 2 is provided with a second through hole, the receiving sensor 22 is located in the second through hole, the second through hole corresponds to a position of the first through hole, and when the printing module 2 is buckled with the printer base 1, the receiving sensor 22 corresponds to the emission sensor 15 in a vertical direction. The emission sensor 15 and the receiving sensor 22 are electrically connected to the controller 17. The receiving sensor 22 receives and recognizes the light emitted by the emission sensor 15, and transmits the recognized signal to the controller 17. The light emitted by the emission sensor 15 of the through-beam photoelectric switch is received by the receiving sensor 22 through the print channel. If a signal received by the receiving sensor 22 is nearly lossless, it is indicated that there is no label paper 4 between the through-beam photoelectric switch. If the signal received by the receiving sensor 22 is strong and a loss exists, it is indicated that a paper gap between two pieces of label paper 4 is located between the through-beam photoelectric switch. If the signal received by the receiving sensor 22 is weak, it is indicated that the label paper 4 to which a label is attached is located between the through-beam photoelectric switch.

A paper exit sensor 16 is disposed in the printer base 1 at the paper exit 12. The paper exit sensor 16 is electrically connected to the controller 17. A timer is disposed on the controller 17. The controller 17 calculates the correct printing position according to the feedback signal of the through-beam photoelectric switch and the paper exit sensor and the timing result of the timer, and controls the rubber roller shaft 14 and the print head assembly 21 to print labels.

Figure 6:
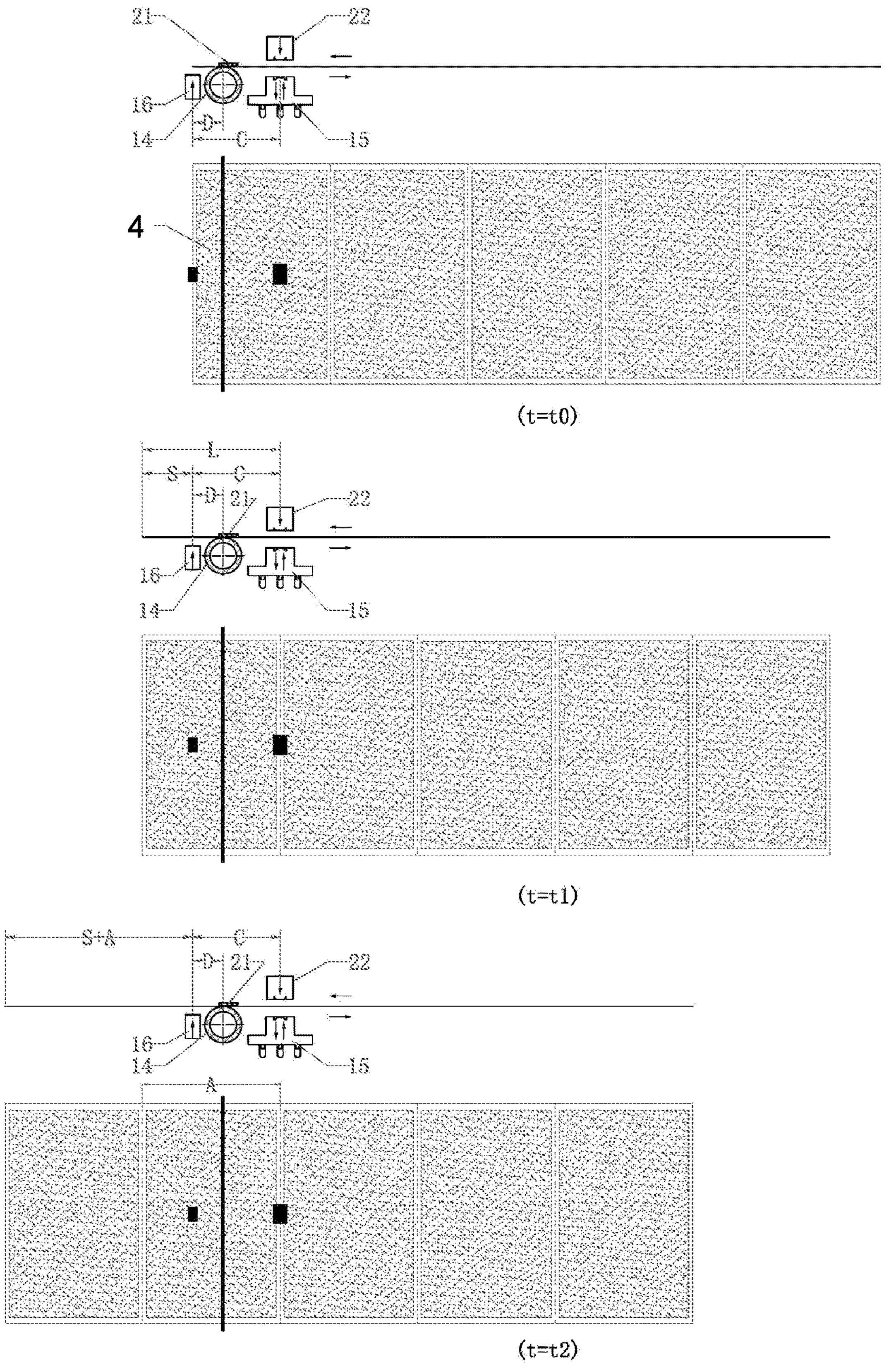
FIG. 6 is a schematic diagram of a position of label paper at time points t0, t1, and t2 according to the present invention.

Based on the foregoing smart label printer, the present invention further provides a printing method of a smart label printer, which is specifically as follows:

S1, after receiving a print signal, the controller 17 of the printer controls the rubber roller shaft 14 to start to transmit label paper 4, and when the paper exit sensor 16 at the paper exit 12 starts to detect the label paper 4, the timer on the controller 17 starts to perform counting and records a current time point as to at which the position of the label paper 4 is shown in FIG. 6;

S2, the rubber roller shaft continues to transfer the label paper 4, when the through-beam photoelectric switch detects a paper gap of the label paper 4, the timer on the controller 17 records a current time point as t1 at which the position of the label paper 4 is shown in FIG. 6, where in this case, the label paper 4 protrudes from the paper exit 12 by a length S; and the rubber roller shaft continues to transfer the label paper 4, when the through-beam photoelectric switch detects a paper gap again, the timer records a current time point as t2 at which the position of the label paper 4 is shown in FIG. 6 and stops counting, where a distance by which the label paper 4 is transferred to the paper exit from the time point t1 to the time point t2 is A, that is, a distance between the two paper gaps on the label paper 4 is A, and in this case the rubber roller shaft 14 stops transferring the label paper 4;

S3, as shown in FIG. 6, a distance between the through-beam photoelectric switch and the paper exit sensor 16 is C, whereby a distance L between the through-beam photoelectric switch and an edge of one protruding end of the label paper 4 is equal to a sum of the distance C between the through-beam photoelectric switch and the paper exit sensor and the length S by which the label paper 4 protrudes from the paper exit from the time point t0 to the time point t1, that is L=C+S, where a distance between an edge of the label paper 4 and its closest paper gap at the time point t1 is obtained as B by performing modulus calculation on A by using L, that is, B=L−A, and when B is 0, it indicates that a first label on the label paper 4 is complete, and when B is not 0, it indicates that the first label is incomplete; and S4, as shown in FIG. 6, the controller 17 controls the rubber roller shaft 14 to reversely rotate for returning the label paper 4 by a length of A+S−B+D in a case that a distance between the edge of the label paper 4 and the paper exit sensor at the time point t2 is A+S and a distance between the paper exit sensor 16 and its closest paper gap is A+S−B, where D is a distance between a center of the rubber roller shaft 14 and the paper exit sensor. The printing part of the print head assembly 21 corresponds to the initial printing position of the label paper 4, and then the controller 17 controls the print head assembly 21 to start printing.

Based on the foregoing description, it can be seen that the embodiments of the present invention have the following technical effects:

The label paper 4 of the printer is placed on one side of the paper feed of the printer, without a paper bin for supporting paper, to reduce the volume of the printer.

The printer is provided with a through-beam photoelectric switch, a paper exit sensor and a controller in cooperation with the printing module for printing. According to the printing method disclosed by the present invention, the label paper 4 can be printed in a correct position more accurately, reducing the waste of the label paper 4; and the printer can intelligently identify the length of the printed label paper 4, and can be applied to print label paper 4 in different sizes.

Compared with the prior art, the printer of the present invention has a small volume, is convenient to replace the printer paper, can intelligently identify the length of the printed label paper 4, and is applied to print label paper 4 in different sizes.

The foregoing descriptions are merely preferred embodiments of the present invention and not intended to limit present invention. For those skilled in the art, the present invention can have various modifications and changes. Any modification, equivalent replacement, improvement, and the like made within the spirit and principle of the present invention shall be included within the protection scope of the present invention.

What is claimed is:

1. A printing method, comprising:

S1, after receiving a print signal, controlling, by a controller of a smart label printer, a rubber roller shaft to start to transfer a label paper, and when a paper exit sensor at a paper exit begins to detect the label paper, performing counting and recording a current time point as to by a timer on the controller; wherein the label paper is transferred in a direction parallel to an axis of a shaft by which a printing module of the smart label printer is hinged with a printer base of the smart label printer;

S2, continuing to transfer the label paper by the rubber roller shaft, recording a current time point as t1 by the timer on the controller when a through-beam photoelectric switch detects a paper gap of the label paper, wherein in this case, the label paper protrudes from the paper exit by a length S; and continuing to transfer the label paper by the rubber roller shaft, recording a current time point as t2 and stopping counting by the timer when the through-beam photoelectric switch detects the paper gap again, wherein a distance by which the label paper is transferred to the paper exit from the time point t1 to the time point t2 is A, that is, a distance between the two paper gaps on the label paper is A, and in this case, the rubber roller shaft stops transferring the label paper;

S3, allowing a distance between the through-beam photoelectric switch and the paper exit sensor to be C, whereby a distance L between the through-beam photoelectric switch and an edge of one protruding end of the label paper is equal to a sum of the distance C between the through-beam photoelectric switch and the paper exit sensor and the length S by which the label paper protrudes from the paper exit from the time point t0 to the time point t1, that is L=C+S; wherein a distance between an edge of the label paper and its closest paper gap at the time point t1 is obtained as B by performing modulus calculation on A by using L, that is, B=L−A; and when B is 0, it indicates that a first label on the label paper is complete, and when B is not 0, it indicates that the first label is incomplete; and S4, controlling, by the controller, the rubber roller shaft to reversely rotate for returning the label paper by a length of A+S−B+D in a case that a distance between the edge of the label paper and the paper exit sensor at the time point t2 is A+S and a distance between the paper exit sensor and its closest paper gap is A+S−B, wherein D is a distance between a center of the rubber roller shaft and the paper exit sensor.

* * * * *